(12) United States Patent
Pereira et al.

(10) Patent No.: US 12,728,895 B2
(45) Date of Patent: Sep. 8, 2026

(54) METHOD AND SYSTEM FOR DEFINING CONSTRUCTION FENCE POLYGONS

(71) Applicant: Torc Robotics, Inc., Blacksburg, VA (US)

(72) Inventors: Savio Pereira, Blacksburg, VA (US); Akshay Pai Raikar, Blacksburg, VA (US); William Davis, Blacksburg, VA (US); Joseph R. Fox-Rabinovitz, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 34 days.

(21) Appl. No.: 18/649,105

(22) Filed: Apr. 29, 2024

(65) Prior Publication Data

US 2025/0333078 A1 Oct. 30, 2025

(51) Int. Cl.
*B60W 60/00* (2020.01)

(52) U.S. Cl.
CPC ... *B60W 60/0015* (2020.02); *B60W 2420/403* (2013.01); *B60W 2420/408* (2024.01); *B60W 2552/50* (2020.02); *B60W 2552/53* (2020.02); *B60W 2554/20* (2020.02); *B60W 2554/80* (2020.02); *B60W 2556/40* (2020.02)

(58) Field of Classification Search
CPC ......... B60W 60/0015; B60W 2554/20; B60W 2552/53; B60W 2556/40; B60W 2554/80
See application file for complete search history.

(56) References Cited

U.S. PATENT DOCUMENTS

| | | | | |
|---|---|---|---|---|
| 9,141,107 | B2 * | 9/2015 | Ferguson | G06V 20/582 |
| 11,837,090 | B2 | 12/2023 | Ma | |
| 12,293,590 | B1 * | 5/2025 | Okawara | G08G 1/167 |
| 2023/0037798 | A1 | 2/2023 | Dalmasso | |
| 2023/0399021 | A1 | 12/2023 | Zhang | |
| 2024/0021075 | A1 | 1/2024 | Moyal | |
| 2024/0288274 | A1 * | 8/2024 | Zhou | G01C 21/3461 |

* cited by examiner

*Primary Examiner* — Toya Pettiegrew
(74) *Attorney, Agent, or Firm* — Armstrong Teasdale LLP

(57) ABSTRACT

A perception system including at least one processor configured to perform operations including (i) identifying at least two construction markers on a road surface based upon analysis of sensor data from a plurality of sensors; (ii) based upon the identification of at least two construction markers, determining a starting point of a construction zone; (iii) for each construction marker identified past the starting point in the construction zone, (a) connecting each construction marker with a corresponding leading construction marker; (b) inserting each construction marker and a respective connection with the corresponding leading construction marker into a graph or a map; and (c) based upon each construction marker and the respective connection inserted into the graph or map, updating a drivable surface and a reference path; and (iv) upon not detecting a new construction marker past the starting point in the construction zone, determining the construction zone has ended is disclosed.

20 Claims, 5 Drawing Sheets

METHOD AND SYSTEM FOR DEFINING CONSTRUCTION FENCE POLYGONS

TECHNICAL FIELD

The field of the disclosure relates to vehicle safety and regulatory compliance and, in particular, to a method and a system for defining construction fence polygons.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Perception technologies generally use sensors like a camera, a radio detection and ranging (RADAR) sensor, a light detection and ranging (LiDAR) sensor for detecting the surrounding environment of the autonomous vehicle. One important aspect of the surrounding environment of the autonomous vehicle is lane markings. However, the lane markings become less relevant when, in construction zones, traffic is diverted to drive through temporary driving lanes created using construction markers, such as barrels, or cones. Accordingly, there exists a need to identify and derive new marking lanes using construction markers placed on the road and determine connectivity between construction markers in real-time to update a reference path or a path on which the autonomous vehicle is guided to drive.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a perception system including a plurality of sensors, and at least one processor configured to execute instructions stored in at least one memory is disclosed. The at least one processor is configured to perform operations including (i) identifying at least two construction markers on a road surface based upon analysis of sensor data from the plurality of sensors; (ii) based upon the identification of at least two construction markers, determining a starting point of a construction zone; (iii) for each construction marker identified past the starting point in the construction zone, (a) determining a corresponding leading construction marker; (b) connecting each construction marker with the corresponding leading construction marker; (c) inserting each construction marker and a respective connection with the corresponding leading construction marker into a graph or a map; and (d) based upon each construction marker and the respective connection inserted into the graph or map, updating a drivable surface and a reference path; and (iv) upon not detecting a new construction marker past the starting point in the construction zone, determining the construction zone has ended.

In another aspect, a computer-implemented method performed by a perception system of a vehicle is disclosed. The method includes (i) identifying at least two construction markers on a road surface based upon analysis of sensor data from a plurality of sensors; (ii) based upon the identification of at least two construction markers, determining a starting point of a construction zone; (iii) for each construction marker identified past the starting point in the construction zone, (a) determining a corresponding leading construction marker; (b) connecting each construction marker with the corresponding leading construction marker; (c) inserting each construction marker and a respective connection with the corresponding leading construction marker into a graph or a map; and (d) based upon each construction marker and the respective connection inserted into the graph or map, updating a drivable surface and a reference path; and (iv) upon not detecting a new construction marker past the starting point in the construction zone, determining an ending point of the construction zone.

In yet another aspect, an autonomous vehicle is disclosed. The autonomous vehicle includes a plurality of sensors including one or more image sensors, one or more light detection and ranging (LiDAR) sensors, or one or more radio detection and ranging (RADAR) sensors. The autonomous vehicle includes at least one processor configured to execute instructions stored in at least one memory to perform operations including (i) identifying at least two construction markers on a road surface based upon analysis of sensor data from the plurality of sensors; (ii) based upon the identification of at least two construction markers, determining a starting point of a construction zone; (iii) for each construction marker identified past the starting point in the construction zone, (a) determining a corresponding leading construction marker; (b) connecting each construction marker with the corresponding leading construction marker; (c) inserting each construction marker and a respective connection with the corresponding leading construction marker into a graph or a map; and (d) based upon each construction marker and the respective connection inserted into the graph or map, updating a drivable surface and a reference path for driving the vehicle; and (iv) upon not detecting a new construction marker past the starting point in the construction zone, determining the construction zone has ended.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
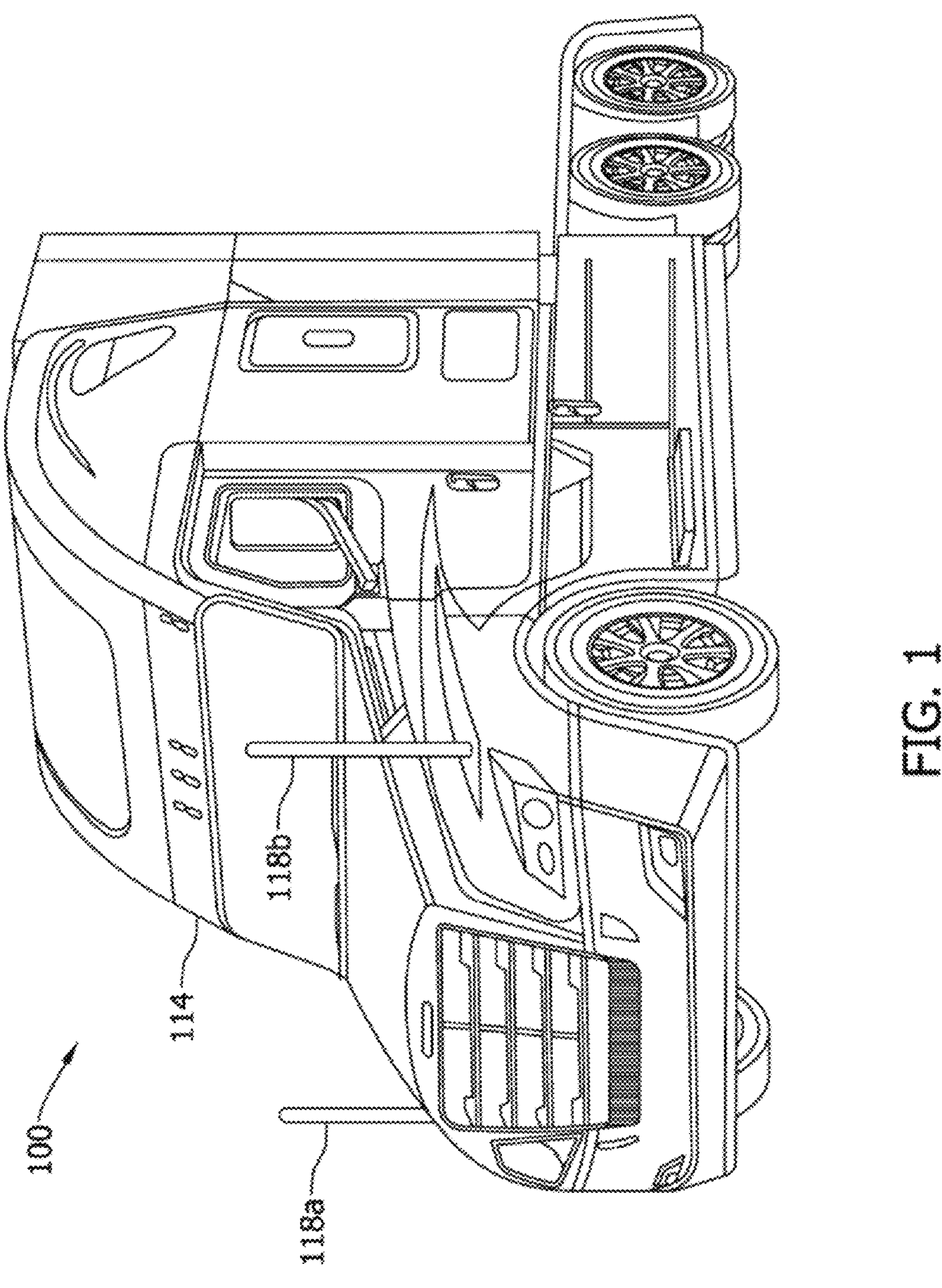
FIG. 1 is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

As described herein, one important aspect of the surrounding environment of the autonomous vehicle is lane markings. However, the lane markings become less relevant when, in construction zones, certain lanes get blocked, or new lanes are created by placement of construction markers, such as barrels or cones. In various embodiments described herein, an algorithm uses additional heuristics to determine connectivity between construction markers in real-time with a feedback loop to connect the placed construction markers to update a reference path. The reference path corresponds with a traffic lane based on the placement of construction markers. The construction markers may be identified using one or more image sensors, one or more light detection and ranging (LiDAR) sensors, or one or more radio detection and ranging (RADAR) sensors.

In some embodiments, based on analysis of sensor data from the one or more image sensors, the one or more LiDAR sensors, or the one or more RADAR sensors, and upon identifying more than one construction marker is present, the construction markers are mapped to a current reference path on a map. By way of a non-limiting example, positions of the construction markers on the current reference path on the map are mapped with detected positions of the construction markers in the environment or surrounding of the autonomous vehicle. As new construction markers are detected with the autonomous vehicle driving along a current reference path, the new construction markers are added in the order they appear on the current reference path. Further, each new construction marker, which is referenced herein as a child node, is connected with a previously identified and added construction marker, which is referenced herein as a parent node. The current reference path gets updated or revised based upon at least one of: (i) the identified and connected construction markers in order of their appearance along the driving path; (ii) a construction marker's linear distance with other neighboring construction markers; and (iii) an angular position of each of one or more other neighboring construction markers with respect to the construction marker.

In some embodiments, based on analysis of the sensor data, when a construction marker is identified as being physically connected, for example, using a caution tape or a barricade tape (generally known as a construction tape), with another construction marker, the two connected construction markers are added as connected construction markers in a graph (or a map). A construction marker may be referenced as a node in the present disclosure. For each node added to the graph (or map) at a respective position, up to N number of nearest neighboring nodes may be evaluated to determine which of the nearest neighboring nodes should be connected with the node. By way of a non-limiting example, a value of N may be configurable, and may be 3 or less.

In some embodiments, from the N number of nearest neighboring nodes for each node, nodes that are within the right angle from $-X_1°$ to $+X_2°$ of a heading of an edge are considered for making connection with the node. Additionally, or alternatively, from the N number of nearest neighboring nodes for each node, nodes that are within a radius, or a linear distance of Y feet are considered for making connection with the node. By way of a non-limiting example, a value of $X_1$, a value of $X_2$, and a value of Y may be configurable. The value of $X_1$ and the value of $X_2$ may be 45 and the value of Y may be 20. When more than one node is found to be present within the right angle from $-X_1°$ to $+X_2°$ of the heading of the edge and within the radius of Y feet, a node that is closest by an angular position is given priority over a node that is farther away based on the angular position. Similarly, when more than one node is found to be present within the right angle from $-X_1°$ to $+X_2°$ of the heading of the prior edge and within the radius of Y feet, a node that is shortest linear distance away from the node is given priority over other nodes within the radius of Y feet. In some embodiments, and by way of a non-limiting example, the closest angular position may be given more weight in comparison with the shortest distance, or vice versa. A node, e.g., a parent node or a first node appearing along a driving path of the autonomous vehicle, may have an angular weight of zero. Additionally, or alternatively, if the connected nodes, as described herein, form a cul-de-sac, then the connections of nodes forming the cul-de-sac are ignored.

In some embodiments, the connected nodes form a lane marking or a connectivity graph, which is considered along with another lane marking, which may be formed using another set of connected nodes or currently present lane markings on the surface of the road, to identify or update the reference path for driving the autonomous vehicle. Additionally, or alternatively, each connectivity graph thus generated connecting a plurality of nodes may be reported to mission control, along with geolocation data of each node of the plurality of nodes. Each connectivity graph may be generated by a perception stack of the autonomous vehicle. Further, a connectivity graph may be identified as a right-side lane marking for the autonomous vehicle, or a left-side lane marking for the autonomous vehicle, based upon whether the connectivity graph is generated from the nodes on the right side or left side of the autonomous vehicle in the direction of travel of the autonomous vehicle.

In some embodiments, mission control may store received information regarding one or more connectivity graphs constructed by the perception stack of the autonomous vehicle. Mission control may update a reference path based on the received information. Alternatively, or additionally, the perception stack of the autonomous vehicle may update the reference path based on the generated one or more connectivity graphs. The updated reference path may be transmitted to mission control along with corresponding geolocation data for the updated reference path. Mission control may transmit the updated reference path to another autonomous vehicle that is approaching the updated reference path based on the reported geolocation data of the other autonomous vehicle. The other autonomous vehicle may confirm or send any updates regarding the reference path identified by a perception stack of the other autonomous vehicle while driving along the reference path and based on the arrangement of nodes detected based on analysis of sensor data of the one or more image sensors, one or more LiDAR sensors, or one or more RADAR sensors installed in the other autonomous vehicle.

Various embodiments in the present disclosure are described with reference to FIGS. 1-5 below.

FIG. 1 illustrates a vehicle 100, such as a truck that may be conventionally connected to a single or tandem trailer to transport the trailer (not shown) to a desired location. The vehicle 100 includes a cabin 114 that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin 114.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors.

Figure 2:
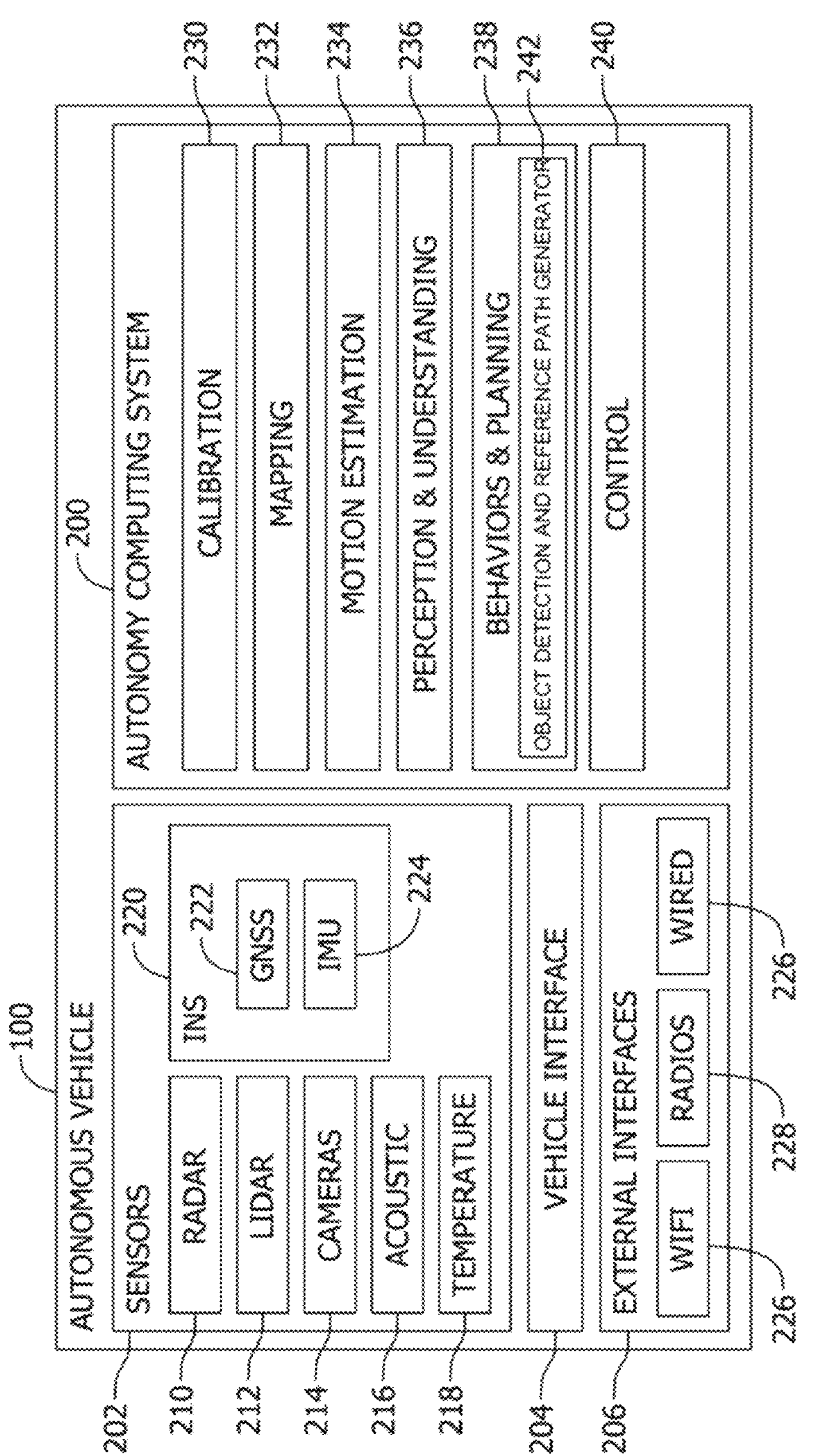
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

In some embodiments, the image data generated by cameras 214 may be transmitted to mission control for one or more of identifying one or more construction markers (or nodes), generating one or more connectivity graphs based upon identified construction markers (or nodes), updating a reference path based upon the one or more connectivity graphs, transmitting the updated reference path to the autonomy vehicle 100 for guiding autonomous vehicle 100 to drive on the updated reference path.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and an object detection and reference path generator module 242. The object detection and reference path generator module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The object detection and reference path generator module 242 may perform one or more tasks including, but not limited to, identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both. Tasks performed by the object detection and reference path generator module 242 are described in detail using FIG. 4 and FIG. 5 below.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
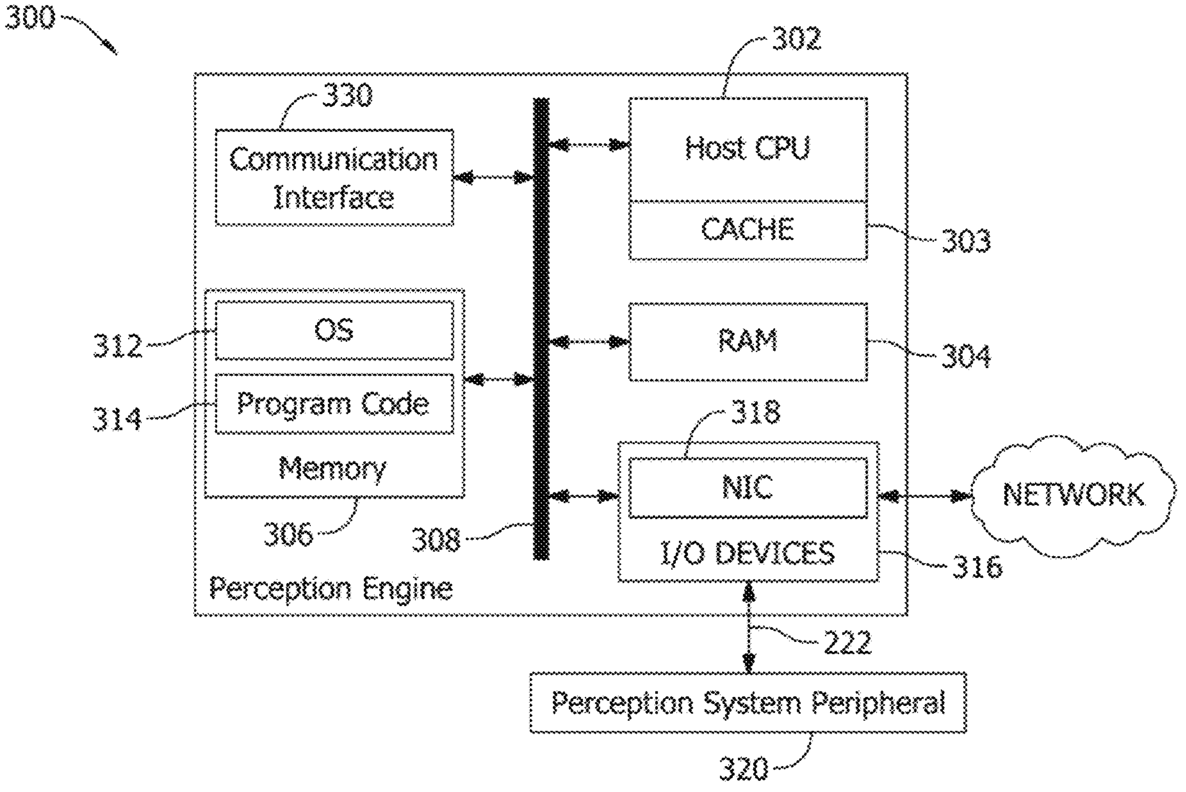
FIG. 3 is a block diagram of an example computing system.

FIG. 3 is a block diagram of an example computing system 300, such as the autonomy computing system 200 shown in FIG. 2, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 2. In alternative embodiments, one or more section of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 4:
FIG. 4 is an example illustration 400 of placement of construction markers on the road.
Figure 4:
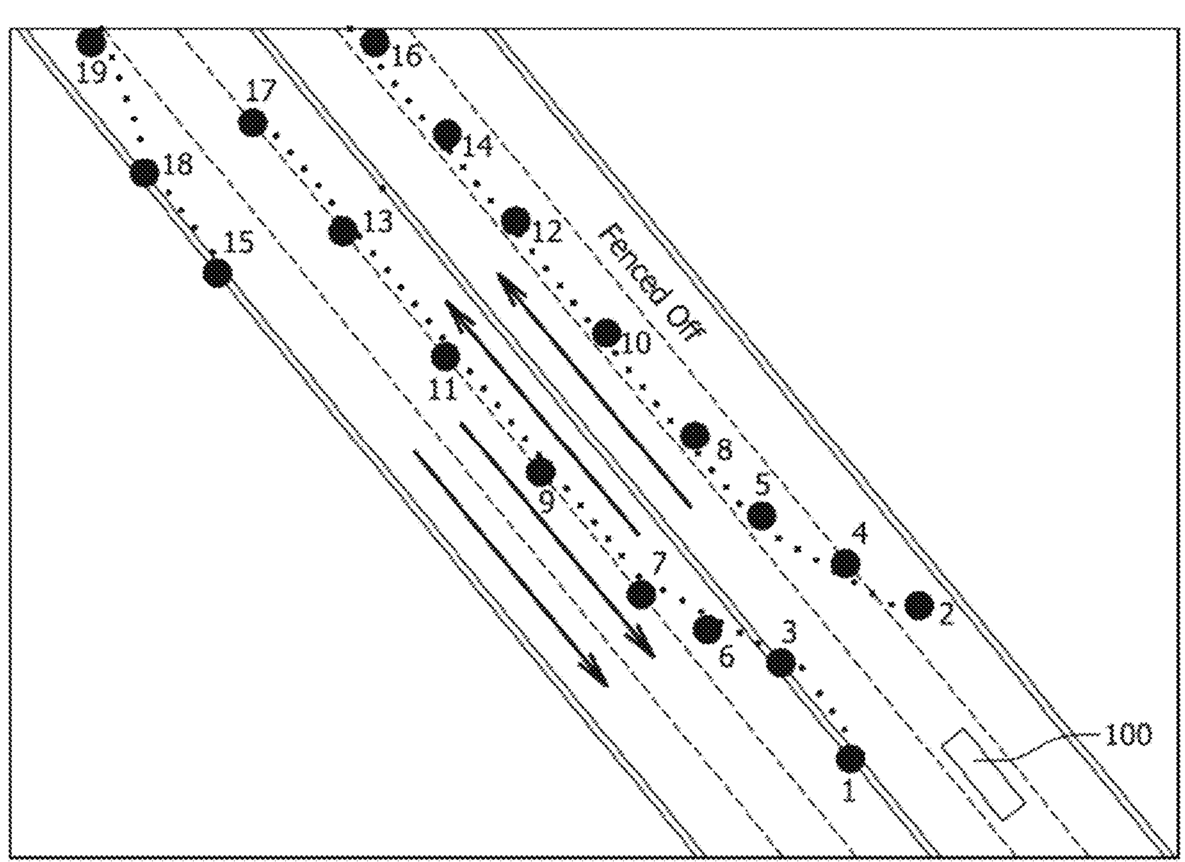

FIG. 4 is an example illustration 400 of placement of construction markers on the road. As shown in FIG. 4, construction markers numbered 1 to 19 may be placed on the road. As shown in FIG. 4, the road may be a two-way road without a divider, and the construction markers 1 to 19 may be placed on the road to block or fence off two right lanes on the north-bound road. Accordingly, only two lanes are open on the north-bound and the south-bound road. Autonomous vehicle 100 travelling on the north-bound round may first approach construction markers numbered 1, 2, and 3 and the construction markers numbered 1, 2, and 3 may be captured in sensor data of cameras 214, LiDAR sensors 212, or RADAR sensors 210.

Figure 5:
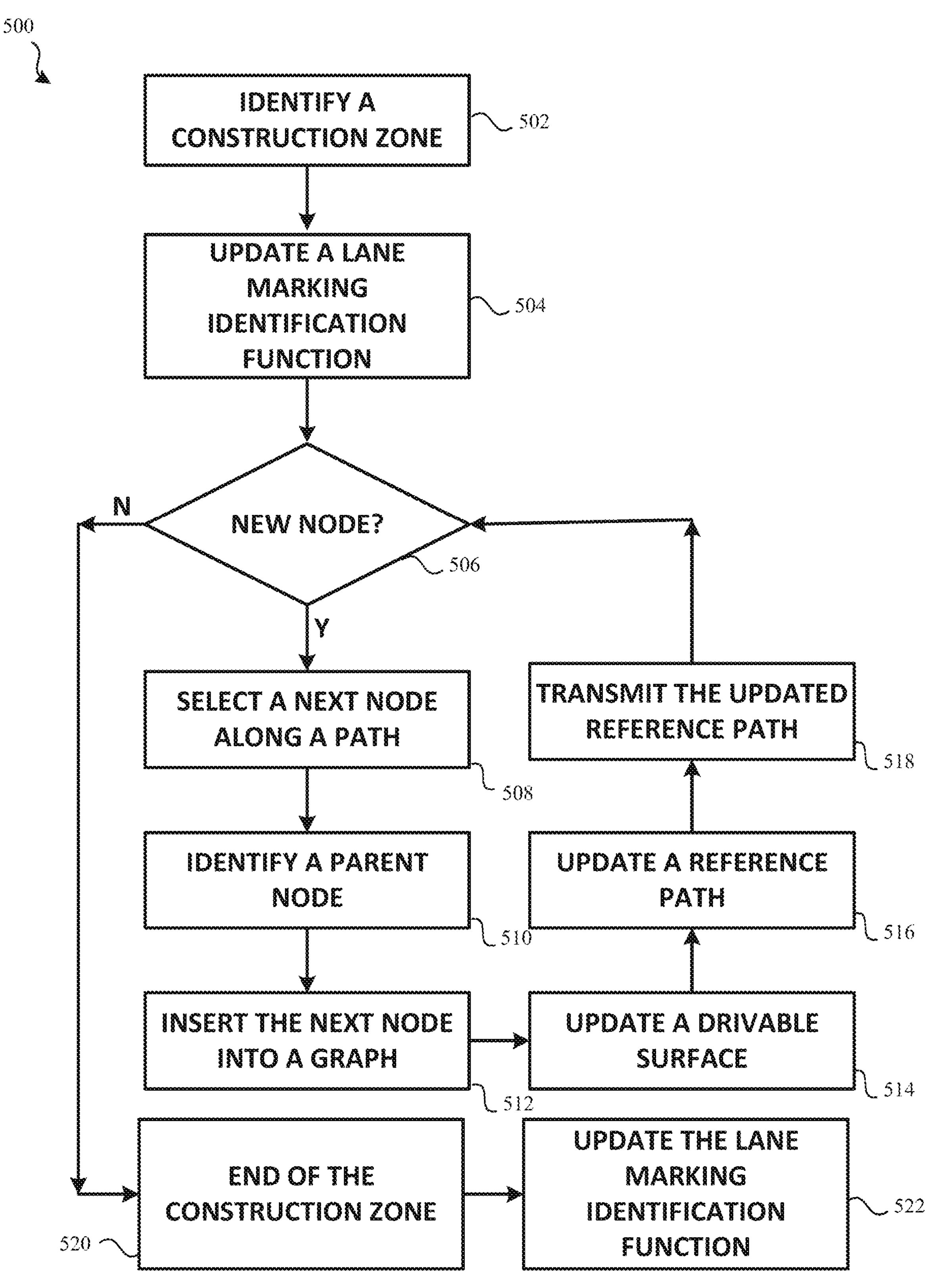
FIG. 5 is a flow-chart of method operations performed by a perception system shown in FIG. 2 or a computing system shown in FIG. 3.

FIG. 5 is an example flow-chart 500 of method operations performed by a perception system, for example, the autonomy computing system 200 or its modules (shown in FIG. 2). If only one construction marker numbered 1 is present on the road, then the construction marker numbered 1 may not be considered to indicate autonomous vehicle 100 is approaching a construction zone.

However, based on the sensor data of cameras 214, LiDAR sensors 212, or RADAR sensors 210, and based upon detecting that more than one construction markers (or any predetermined number of construction markers) are present, the autonomy computing system 200 or its modules (shown in FIG. 2) may identify 502 that autonomous vehicle 100 is approaching a construction zone. As described herein, and as shown in FIG. 4, the plurality of construction markers is used to form a temporary marking lane in the construction zone. However, each construction marker of the plurality of construction markers needs to be connected to at least one other construction marker to form a marking lane. As described herein, construction markers numbered 1 may be the first construction marker detected in the sensor data in the direction of travel of autonomous vehicle 100. As autonomous vehicle 100 travels further, construction markers numbered 2 and 3 may be detected. Additionally, positions of construction markers 2 and 3 may be detected as being on the opposite sides of autonomous vehicle 100.

Upon detecting at least two construction markers, for examples, construction markers numbered 1 and 3, or construction markers numbered 1 and 2, the autonomy computing system 200 (or its one or more modules) may identify 502 that autonomous vehicle 100 is approaching the construction zone, and a starting point of the construction zone may be marked. The autonomy computing system 200 (or its one or more modules) may override or update 504 a lane marking identification function to use each construction marker and the respective connection to insert into a graph or map as a lane marking in the construction zone.

In some embodiments, based on analysis of the sensor data and upon identifying that more than one construction markers are present, the construction markers numbered 1, 2, and 3 are mapped to a current reference path on the graph or map. Additionally, detected positions of the construction markers numbered 1, 2, and 3 in the environment or surrounding autonomous vehicle 100 may be mapped on the current reference path. As new construction markers, for example, construction markers numbered 4, 6, 5, and 7, etc., are detected 506 with autonomous vehicle 100 driving along a current reference path, the new construction markers are added in the order they appear on the current reference path. As described herein, a construction marker may be referenced as a node, and each node is connected with at least one another node that is previously detected and referenced herein as a parent node (or a leading construction marker). A node being connected with the parent node may be referenced herein as a child node.

As described herein, each new detected node needs to be connected with a parent node. The autonomy computing system 200 (or its one or more modules) may select 508 one or more nodes along the path of travel of autonomous vehicle 100 to connect with a parent node. As described herein, a node is connected with a parent node based upon at least one of: (i) an order of appearance of nodes along the reference path; (ii) a respective position of a node with respect to a position of autonomous vehicle 100 including a perception system (or the autonomy computing system 200); (iii) a respective linear distance of the node from other neighboring nodes; and (iv) a respective angular position of the other neighboring nodes with respect to the node. In some embodiments, and by way of a non-limiting example, the corresponding parent node is selected based on whether the node is on the right side or left side of autonomous vehicle 100.

In some embodiments, based on analysis of the sensor data, when a node is identified as being physically connected, for example, using a caution tape or a barricade tape (generally known as a construction tape), with another node, the two connected nodes are added as connected nodes in the graph or map. For each node added to the graph or map at a respective position, up to N number of nearest neighboring nodes may be evaluated to determine which of the nearest neighboring nodes the node should be the parent node. By way of a non-limiting example, a value of N may be configurable, and may be 3 or less.

Accordingly, in some embodiments, nodes 1 and 3 being on the same side (e.g., the left side of autonomous vehicle 100), the autonomy computing system 200 (or its one or more modules) may identify 510 node 1 as a parent node for node 3. Node 2, which is on the right side of autonomous vehicle 100 may be identified 510 as another parent node. Nodes 1, 2, and 3 may be inserted 512 into a graph (or a map) and a drivable surface for autonomous vehicle 100 may be updated 514. Corresponding to the updated 514 drivable surface, a reference path may be updated 516 and transmitted 518 to other modules of the autonomy computing system (e.g., the behaviors and planning module 238).

As autonomous vehicle 100 continues driving along the updated reference path, new construction markers, for example, construction markers numbered 4, 6, 5, and 7, etc., may be detected 506. The autonomy computing system 200 (or its one or more modules) may select 508 one or more nodes (e.g., nodes 4, 5, 6, and 7) along the path of travel of autonomous vehicle 100 to connect with a parent node (e.g., nodes 1, 2, or 3). At this stage, a parent node from N number of nearest neighboring nodes may be identified 510 for a child node. In particular, N number of nearest neighboring nodes within the right angle from $-X_1°$ to $+X_2°$ of a heading of an edge of a child node are considered for making connection with the child node as a parent node. Additionally, or alternatively, from the N number of nearest neighboring nodes, nodes which are within a radius or linear distance of Y feet are considered for making a connection with the child node as the parent node. By way of a non-limiting example, a value of X and a value of Y may be configurable. The value of $X_1$ or the value of $X_2$ may be 45 and the value of Y may be 20.

When more than one node is found to be present within the right angle from $-X_1°$ to $+X_2°$ of the heading of the edge and within a radius of Y feet, a node that is closest by an angular position is given priority over a node that is farther away based on the angular position to be connected with the child node as the parent node. Similarly, when more than one node is found to be present within the right angle from $-X_1°$ to $+X_2°$ of the heading of the prior edge and within a radius of Y feet, a node that is shortest linear distance away from the node is given priority over other nodes within the radius of Y feet to be connected with the child node as the parent node. In some embodiments, and by way of a non-limiting example, the closest angular position may be given more weight in comparison with the shortest distance, or vice versa. Accordingly, for node 4, node 2 may be identified 510 as the parent node based upon the angular position and linear distance criteria described above. Similarly, for node 6, node 3 may be identified 510 as the parent node based upon the angular position and linear distance criteria described above. Nodes 4 and 6 may be inserted 512 into the graph (or the map) and the drivable surface for autonomous vehicle 100 may be updated 514. The updated reference path may be transmitted 516 to other modules of the autonomy computing system (e.g., the behaviors and planning module 238). Tasks/operations 506, 508, 510, 512, 514, 516, and 518 may be performed as long as new nodes are detected while autonomous vehicle 100 continues driving on the updated reference path.

When no new node is detected 506, the autonomy computing system 200 (or its one or more modules) may determine that the construction zone is ended 520 and may enable or update 522 the lane marking identification function to use lane markings on the road surface outside of the construction zone. In the present disclosure, lane markings on the road surface are lines painted or printed on the road surface.

As described herein, the connected nodes form a lane marking or a connectivity graph. Each generated connectivity graph may be reported to mission control, along with geolocation data of each node included in the generated connectivity graph. Further, a connectivity graph may be identified as a right-side lane marking for the autonomous vehicle, or a left-side lane marking for the autonomous vehicle, based upon whether the connectivity graph is generated from the nodes on the right side or left side of the autonomous vehicle in the direction of travel of the autonomous vehicle. The generated connectivity graph may be considered along with another connectivity graph generated according to embodiments described herein, or currently present lane markings on the surface of the road, to identify or update the reference path for driving autonomous vehicle 100.

An example technical effect of the methods, systems, and apparatus described herein includes at least one of: (a) improvised perception stack to identify and update a reference path using lane marking on the road surface and/or construction markers placed on the road surface; and (b) improving safety and security of an autonomous vehicle while driving in a construction zone.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A perception system of an autonomous vehicle, comprising:
- a plurality of sensors; and
- at least one processor configured to execute instructions stored in at least one memory to perform operations comprising:
  - identifying at least two construction markers on a road surface based upon analysis of sensor data from the plurality of sensors;
  - based upon the identification of at least two construction markers, determining a starting point of a construction zone;
  - forming rows of connected construction markers by:
    - for each construction marker identified past the starting point in the construction zone,
      - determining a corresponding leading construction marker; and
      - connecting each construction marker with the corresponding leading construction marker;
  - inserting each construction marker and a respective connection with the corresponding leading construction marker into a graph or a map;
  - based upon each construction marker and the respective connection inserted into the graph or the map, updating a drivable surface and a reference path positioned between neighboring rows of the connected construction markers; and
  - upon not detecting a new construction marker past the starting point in the construction zone, determining the construction zone has ended,
- wherein an autonomy computing system of the autonomous vehicle is configured to control operation of the autonomous vehicle, based on the drivable surface and the reference path.

2. The perception system of claim 1, wherein the operations further comprising updating a lane marking identification function to use each construction marker and the respective connection inserted into the graph or the map as a lane marking in the construction zone.

3. The perception system of claim 2, wherein the operations further comprising updating the lane marking identification function to use lane markings on the road surface outside of the construction zone.

4. The perception system of claim 1, wherein the plurality of sensors includes one or more image sensors, one or more light detection and ranging (LiDAR) sensors, or one or more radio detection and ranging (RADAR) sensors.

5. The perception system of claim 1, wherein the corresponding leading construction marker is identified based upon at least one of: (i) an order of appearance of construction markers along the reference path; (ii) a respective position of a construction marker with respect to a position of a vehicle including the perception system; (iii) a respective linear distance of the construction marker from other neighboring construction markers; or (iv) a respective angular position of the other neighboring construction markers with respect to the construction marker.

6. The perception system of claim 5, wherein the corresponding leading construction marker and the construction marker are on the same right side or left side of the position of the vehicle.

7. The perception system of claim 5, wherein the other neighboring construction markers are within a predetermined Y ft linear distance of the construction marker.

8. The perception system of claim 7, wherein the predetermined Y ft is 20 feet.

9. The perception system of claim 5, wherein the other construction markers are within a right angle from predetermined $-X_1$ degrees to predetermined $+X_2$ degrees of a heading of an edge of the construction marker.

10. The perception system of claim 9, wherein the predetermined $-X_1$ degrees are −45 degrees and the predetermined $+X_2$ degrees are +45 degrees.

11. The perception system of claim 5, wherein the respective angular position of the other neighboring construction markers with respect to the construction marker is given priority over the respective linear distance of the construction marker from the other neighboring construction markers.

12. A computer-implemented method performed by a perception system of an autonomous vehicle, the method comprising:
- identifying at least two construction markers on a road surface based upon analysis of sensor data from a plurality of sensors;
- based upon the identification of at least two construction markers, determining a starting point of a construction zone;
- forming rows of connected construction markers by:
  - for each construction marker identified past the starting point in the construction zone, determining a corresponding leading construction marker; and connecting each construction marker with the corresponding leading construction marker;

inserting each construction marker and a respective connection with the corresponding leading construction marker into a graph or a map;

based upon each construction marker and the respective connection inserted into the graph or the map, updating a drivable surface and a reference path positioned between neighboring rows of the connected construction markers; and upon not detecting a new construction marker past the starting point in the construction zone, determining an ending point of the construction zone, wherein an autonomy computing system of the autonomous vehicle is configured to control operation of the autonomous vehicle, based on the drivable surface and the reference path.

13. The computer-implemented method of claim 12, further comprising:

updating a lane marking identification function to use each construction marker and the respective connection inserted into the graph or the map as a lane marking in the construction zone; and updating the lane marking identification function to use lane markings on the road surface outside of the construction zone.

14. The computer-implemented method of claim 12, wherein the plurality of sensors includes one or more image sensors, one or more light detection and ranging (LiDAR) sensors, or one or more radio detection and ranging (RADAR) sensors.

15. The computer-implemented method of claim 12, wherein the corresponding leading construction marker is identified based upon at least one of: (i) an order of appearance of construction markers along the reference path; (ii) a respective position of a construction marker with respect to a position of a vehicle including the perception system; (iii) a respective linear distance of the construction marker from other neighboring construction markers; or (iv) a respective angular position of the other neighboring construction markers with respect to the construction marker.

16. The computer-implemented method of claim 15, wherein the corresponding leading construction marker and the construction marker are on the same right side or left side of the position of the vehicle.

17. The computer-implemented method of claim 15, wherein:

the other neighboring construction markers are within a predetermined Y ft linear distance of the construction marker or within a right angle from predetermined $-X_1$ degrees to predetermined $+X_2$ degrees of a heading of an edge of the construction marker.

18. The computer-implemented method of claim 17, wherein the predetermined Y feet is 20 feet, and wherein the predetermined $-X_1$ degrees are-45 degrees and the predetermined $+X_2$ degrees are +45 degrees.

19. The computer-implemented method of claim 15, wherein the respective angular position of the other neighboring construction markers with respect to the construction marker is given priority over the respective linear distance of the construction marker from the other neighboring construction markers.

20. An autonomous vehicle, comprising:

a plurality of sensors including one or more image sensors, one or more light detection and ranging (LiDAR) sensors, or one or more radio detection and ranging (RADAR) sensors; and at least one processor configured to execute instructions stored in at least one memory to perform operations comprising:

identifying at least two construction markers on a road surface based upon analysis of sensor data from the plurality of sensors;

based upon the identification of at least two construction markers, determining a starting point of a construction zone;

forming rows of connected construction markers by:

for each construction marker identified past the starting point in the construction zone, determining a corresponding leading construction marker; and connecting each construction marker with the corresponding leading construction marker;

inserting each construction marker and a respective connection with the corresponding leading construction marker into a graph or a map;

based upon each construction marker and the respective connection inserted into the graph or the map, updating a drivable surface and a reference path positioned between neighboring rows of the connected construction markers; and upon not detecting a new construction marker past the starting point in the construction zone, determining the construction zone has ended, wherein an autonomy computing system of the autonomous vehicle is configured to control operation of the autonomous vehicle, based on the drivable surface and the reference path.

* * * * *